Figures 1, 2:
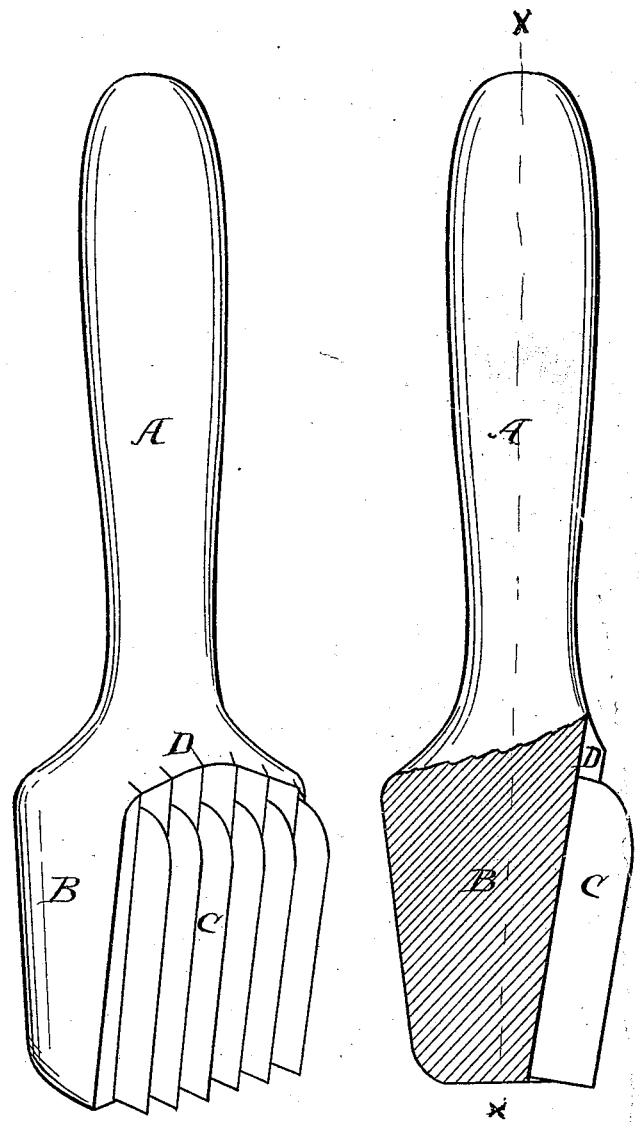

UNITED STATES PATENT OFFICE.

HIRAM C. BURK, OF CLEVELAND, OHIO.

STEAK-TENDERER.

SPECIFICATION forming part of Letters Patent No. 421,855, dated February 18, 1890.

Application filed May 27, 1889. Serial No. 312,238. (No model.)

*To all whom it may concern:*

Be it known that I, HIRAM C. BURK, of Cleveland, in the county of Cuyahoga and State of Ohio, have invented certain new and useful Improvements in a Hand Steak-Tenderer, of which the following is a specification.

My invention relates to hand meat or steak tenderers; and the novelty consists in the peculiar construction, arrangement, and adaptation of parts, as will be more fully hereinafter set forth, and specifically pointed out in the specification, drawings, and claim, in which—

Figure 1 is a perspective view of my hand steak-tenderer, showing a gang of knives located in the body B. Fig. 2 is a sectional view showing the knives C C and recess D in which the knives are located.

Similar letters refer to similar parts throughout the several views.

To enable others skilled in the art to make and use my invention, I will describe it more fully, referring to the drawings and letters thereon.

Fig. 1 shows my improved meat or steak tenderer, which is composed of wood and steel knives, the body B and handle A being composed of one single piece of hard wood, the body or end the knives are located in being much larger than the handle end, which is first turned, and then having one side flattened diagonally to the central line $x$ $x$, as shown in Fig. 2, and being flattened on one side to give a broad surface, and also for the purpose of elevating the handle end A when the knives are applied horizontally to the steak, allowing the hand to pass readily over the same without touching any part thereof, and also for the purpose of giving a surface sufficiently wide to admit of several narrow grooves to receive the cutting-knives. In Fig. 1 is also shown a gang of knives of about six in number, but may be more or less, as desired, having their upper ends beveled or partly rounded, so that the knives will readily enter the steak, while the opposite ends are cut nearly or at a right angle to the cutting-edge, and by elevating the handle end it will cut deep into the steak.

The handle A and body B are first turned or rounded, and then the enlarged end B is flattened on an oblique angle to the central line $x$ $x$, for the purpose of giving a broad surface to admit of several narrow grooves in which the knives are driven and held by the friction on either side of the same, and may be readily removed to sharpen or renew the same.

In preparing steak I scarify in one direction, then cross-scarify, then turn the steak half over and repeat the same operation. This leaves the steak tender and easy of mastication and does not fill up and adhere together, as is the case when meat is hammered or bruised. Meat when once cut or scarified with sharp knives will not adhere together, but allows the hot grease or gravy of the meat to enter readily, which assists in cooking, seasoning, and giving the meat so prepared a rich flavor and is much more palatable.

Having thus described my invention, what I claim as new, and desire to secure by Letters Patent, is—

The steak-tenderer described and shown, consisting of the head B, having a laterally-projecting handle A, the head having a flat face inclined to the handle and provided with longitudinal parallel grooves or saw-kerfs, each carrying a long and narrow cutting-blade, the heel being rounded and the point angular, as set forth.

HIRAM C. BURK.

Witnesses:
JOS. F. POND,
FRANK C. GALLUP.